US012425706B2

United States Patent
Lehtola et al.

(10) Patent No.: US 12,425,706 B2
(45) Date of Patent: Sep. 23, 2025

(54) SHARED WINDOW FOR COMPUTING DEVICE CAMERA LENSES AND PHOTOFLASH

(71) Applicant: Microsoft Technology Licensing, LLC, Redmond, WA (US)

(72) Inventors: Eeva Liisa Lehtola, Salo (FI); Pertti Ensio Savolainen, Salo (FI); Virpi Tuulikki Niemenmaa, Järvenpää (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 406 days.

(21) Appl. No.: 17/837,560

(22) Filed: Jun. 10, 2022

(65) Prior Publication Data

US 2023/0403447 A1  Dec. 14, 2023

(51) Int. Cl.
| | | |
|---|---|---|
| *H04N 23/51* | (2023.01) | |
| *G02B 3/08* | (2006.01) | |
| *G03B 30/00* | (2021.01) | |
| *G06F 1/16* | (2006.01) | |
| *H04N 23/55* | (2023.01) | |
| *H04N 23/56* | (2023.01) | |
| *H04N 23/57* | (2023.01) | |
| *H04N 23/90* | (2023.01) | |

(52) U.S. Cl.
CPC ............... *H04N 23/51* (2023.01); *G02B 3/08* (2013.01); *G03B 30/00* (2021.01); *G06F 1/1686* (2013.01);
(Continued)

(58) Field of Classification Search
CPC ........ H04N 23/51; H04N 23/55; H04N 23/56; H04N 23/57; H04N 23/90; H04N 23/13;
(Continued)

(56) References Cited

U.S. PATENT DOCUMENTS 9,819,874 B2  11/2017 Chien et al.
10,036,531 B2  7/2018 Mallory et al.
(Continued)

FOREIGN PATENT DOCUMENTS

EP  2667585 A1  11/2013
KR  101394190 B1  5/2014

OTHER PUBLICATIONS

Artashyan, Argam, "Samsung Developing Flat Super Lens that can Make Phone Cameras Thinner", Retrieved from: https://www.gizchina.com/2021/07/11/samsung-developing-flat-super-lens-that-can-make-phone-cameras-thinner/, Jul. 11, 2021, 15 Pages.
(Continued)

*Primary Examiner* — Mekonnen D Dagnew
(74) *Attorney, Agent, or Firm* — Holzer Patel Drennan

(57) ABSTRACT

Mobile computing devices often incorporate a digital camera module to capture photographs and/or record video using one or more built-in digital cameras and photoflash LEDs. The photoflash LEDs are separated from the digital cameras and sensors within the digital camera module to provide an optical barrier therebetween. To aid the physical separation, a flat translucent window over the digital cameras is typically not shared with the photoflash LEDs. Such separation efforts are visually and tactilely evident to a user and introduce gaps that can be a source of moisture and/or particulate entry into the computing device. The presently disclosed technology introduces a common flat translucent window over the digital camera and photoflash LEDs within the digital camera module. Features adopted into the shared flat translucent window provide sufficient optical separation between the photoflash LEDs and the nearby cameras within the digital camera module.

18 Claims, 3 Drawing Sheets

(52) U.S. Cl.
CPC ............ *H04N 23/55* (2023.01); *H04N 23/56* (2023.01); *H04N 23/57* (2023.01); *H04N 23/90* (2023.01)

(58) Field of Classification Search
CPC .......... H04N 23/00; G02B 3/08; G03B 30/00; G03B 2215/0592; G03B 15/05; G06F 1/1686
See application file for complete search history.

(56) References Cited

U.S. PATENT DOCUMENTS

| | | |
|---|---|---|
| 10,129,377 B2 | 11/2018 | Evans, V |
| 10,915,007 B2 | 2/2021 | Tsujikawa |
| 11,212,377 B2 | 12/2021 | Jeon |
| 2014/0063049 A1* | 3/2014 | Armstrong-Muntner ................... H04N 23/56 345/619 |
| 2015/0094124 A1* | 4/2015 | Kuo .................... H04M 1/0254 455/575.1 |
| 2020/0396359 A1 | 12/2020 | Rosen et al. |
| 2021/0136187 A1* | 5/2021 | Jeon ................... H04M 1/0264 |
| 2021/0356844 A1 | 11/2021 | Song et al. |

OTHER PUBLICATIONS

"International Search Report and Written Opinion Issued in PCT Application No. PCT/US23/019043", Mailed Date: Jul. 19, 2023, 11 Pages.

\* cited by examiner

SHARED WINDOW FOR COMPUTING DEVICE CAMERA LENSES AND PHOTOFLASH

BACKGROUND

Mobile computing devices often incorporate a digital camera module to capture photographs and/or record video using one or more built-in digital cameras, sensors, and photoflash LEDs (light-emitting diodes). Mobile computing devices can store and selectively send the resulting images and video wirelessly to other computing devices. The photoflash LEDs are separated from the digital cameras and sensors within the digital camera module to provide an optical barrier therebetween.

SUMMARY

Implementations described and claimed herein provide a computing device camera module comprising a first camera, a photoflash, and a flat translucent window extending over the first camera and the photoflash. In some implementations, an underside of the flat translucent window includes a lens oriented over the photoflash. In other implementations, a perimeter groove is formed in an underside of the flat translucent window, the perimeter groove circumscribing the photoflash and filled with an opaque material.

Implementations described and claimed herein further provide a method of manufacturing a computing device camera module comprising assembling a first camera and a photoflash within a computing device chassis; forming a flat translucent window including an integrated lens on an underside of the flat translucent window; and securing the flat translucent window over the first camera and the photoflash, wherein the lens is oriented over the photoflash.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

Due to space limitations on mobile computing devices, particularly device thickness, digital camera modules are typically equipped with fixed-focus camera lenses and sensors with limited performance in poor lighting. Further, again due to space limitations, digital camera modules lack a physical shutter, which can yield a relatively long shutter lag. A long-duration photoflash to accommodate the shutter lag is typically provided by an internal LED illumination source. Photoflash LEDs illuminate less intensely over a longer exposure time than a traditional flash strobe.

Light output from photoflash LEDs can interfere with operation of nearby cameras and sensors within a digital camera module. Physical separation of photoflash LEDs from digital cameras and sensors within a digital camera module generally provides an optical barrier to reduce or eliminate this interference (also referred to as light leakage). To aid the physical separation, a flat translucent window over the digital camera(s) and sensor(s) is typically not shared with the photoflash LED(s).

While effective at reducing or elimination light leakage, such separation efforts, including separate windows for the camera(s)/sensor(s) and Photoflash LED(s), is visually and tactilely evident to a user. The user may interpret the resulting discontinuities as an indicator of lower overall computing device quality. Further, separation efforts introduce gaps that can be a source of moisture and/or particulate entry into the computing device. The presently disclosed technology introduces a common flat translucent window over digital camera(s), sensor(s), and photoflash LED(s) within a digital camera module of a computing device. Features adopted into the shared flat translucent window provide sufficient optical separation between the photoflash LED(s) and the nearby camera(s) and sensor(s) within the digital camera module.

Figure 1:
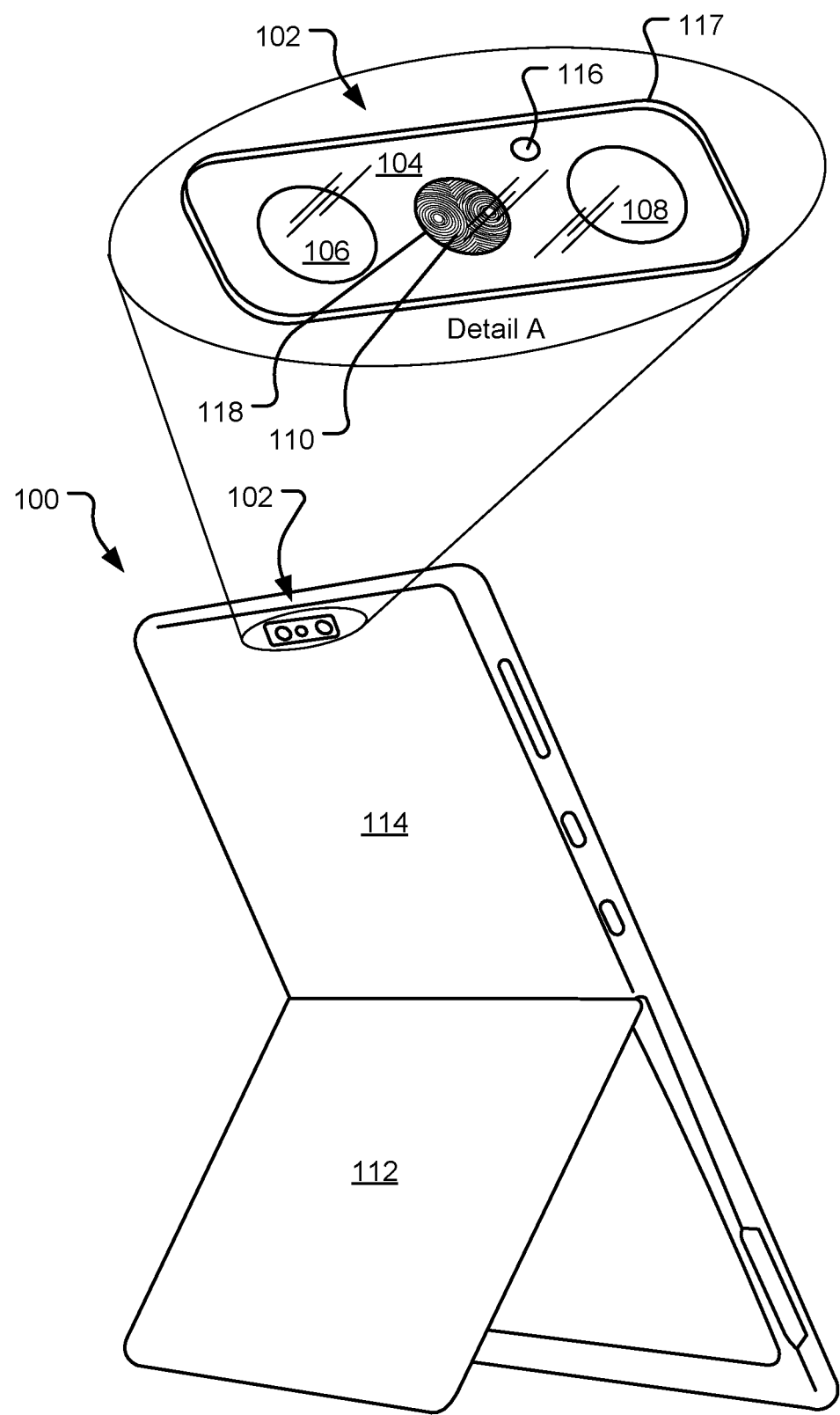
FIG. 1 illustrates a perspective view of an example mobile computing device equipped with a digital camera module having a shared window for two cameras and a photoflash.

FIG. 1 illustrates a perspective view of an example mobile computing device 100 equipped with a digital camera module 102 having a shared window 104 for two cameras 106, 108 and a photoflash 110. The mobile computing device 100 is a tablet computer having a chassis 114 with a kickstand 112 selectively deployed to hold the mobile computing device 100 in a semi-upright position. In other implementations, the kickstand 112 is omitted. The digital camera module 102 is incorporated in a rear-facing exterior surface of the chassis 114. In other implementations, the digital camera module 102 is incorporated in a front-facing exterior surface of the chassis 114. In still further implementations, a pair of digital camera modules are utilized in the chassis 114, one in the rear-facing exterior surface and the other in the front-facing exterior surface of the chassis 114. The presently disclosed technology may be applied to a variety of digital camera modules, regardless of their number and location on the chassis 114.

While the mobile computing device 100 is illustrated as a tablet computer, the digital camera module 102 may be incorporated into any computing device (e.g., mobile phones, laptop computers, personal computers, desktop computers, gaming devices, smart phones) capable of carrying out one or more sets of arithmetic and/or logical operations. Still further, the digital camera module 102 may be used in vehicles (e.g., automobiles, other land-based vehicles, watercraft, and aircraft), consumer electronics (e.g., digital cameras and home appliances), consumer apparel (e.g., helmets and garments), medical devices, and industrial or commercial machinery, any of which may adopt one or more of the digital camera modules 102 as contemplated herein.

The digital camera module 102 (see e.g., Detail A), is illustrated as an oblong rounded rectangular shape accommodating the two cameras 106, 108 with the photoflash 110 therebetween. The digital camera module 102 also includes an auxiliary sensor 116 (e.g., a light sensor, microphone, etc.). In other implementations, the digital camera module 102 may take any shape that accommodates the cameras 106, 108, photoflash 110, sensor 116, with or without rounded corners. Other implementations of the digital camera module 102 may include one camera or more than two cameras, multiple photoflashes, and/or no sensors or multiple sensors, as defined by overall performance specifications of the digital camera module 102.

The cameras 106, 108 each include a digital image sensor (e.g., a charge-coupled device (CCD) or complimentary metal-oxide-semiconductor (CMOS) sensor) and at least one camera lens (e.g., a simple convex lens or a complex lens with convex elements and other features to fine tune the optical characteristics thereof) to direct incoming light to the digital image sensor. The light is directed in a manner that enables the digital image sensor to generate still images or a video output of the incoming light that accurately reflects a scene that that the cameras 106, 108 are visually capturing.

The photoflash 110 provides a brief burst of light to help illuminate a scene to be captured by the cameras 106, 108. The photoflash 110 includes one or more high-current flash LEDs, which are capable of low-voltage and high-efficiency operation, as well as extreme miniaturization. In addition to providing illumination for the cameras 106, 108, the photoflash 110 can also be used as an autofocus assist lamp in low-light conditions.

In some implementations, the photoflash 110 is further equipped with a photoflash lens to focus the light output from the high-current flash LEDs. While the photoflash lens may take a variety of forms, one example form is a Fresnel lens. The Fresnel lens permits a large aperture and short focal length without the mass and volume of material that would be required by a lens of conventional design to achieve the same or similar optic effects. Further, a Fresnel lens can be made much thinner than a comparable conventional lens, in some cases taking the form of a flat sheet, as disclosed herein. Other complex lens patterns contemplated herein for the photoflash lens include convex elements, other Fresnel patterns, and/or other features.

The shared window 104 is a flat layer of transparent or translucent material (e.g., glass or plastic) that extends over the cameras 106, 108, photoflash 110, and sensor 116 and is defined by a window perimeter 117. In other implementations, the sensor 116 is separately located and not under the shared window 104. In still further implementations, the shared window 104 incorporates an aperture to accommodate the sensor 116 (e.g., a pinhole for a microphone). The shared window 104 forms a protective barrier to moisture and/or particulate contamination to the cameras 106, 108, photoflash 110, and sensor 116, as well as moisture and/or particulate contamination to an interior of the mobile computing device 100. In some implementations, the window perimeter 117 includes a protruding rim to provide protection to the interior of the shared window 104.

The shared window 104 includes one or more patterned features on a rear-facing side of the shared window 104. A patterned feature is located over the photoflash 110 and includes a photoflash lens incorporated into the shared window 104. In contrast, conventional photoflash lenses are separate from a conventional window for digital cameras and exclusive to a conventional photoflash. In an example implementation, the photoflash lens includes a Fresnel pattern to create a Fresnel lens out of the shared window 104 at a first patterned area overlying the photoflash 110. The Fresnel pattern serves to capture oblique light emitted from the photoflash 110 LED(s) and focus the light output to create a photoflash. In various implementations, the Fresnel pattern renders an otherwise transparent shared window 104 to be translucent in the area of the photoflash 110.

Another patterned feature is located over one or both of the cameras 106, 108 and includes a camera lens(es) incorporated into the shared window 104 in a patterned area overlying one or both of the cameras 106, 108 (e.g., a short-range lens for camera 106 and a long-range lens for camera 108). In contrast, a conventional camera lens for a conventional digital camera module is separate from and lies below a conventional window for the conventional digital camera module. By incorporating the camera lens(es) directly into the shared window 104, overall space occupied by the digital camera module 102, particularly in a depth dimension is reduced as a camera lens separate from the shared window 104 may be omitted from the digital camera module 102.

Yet another patterned feature is a perimeter groove 118 in the shared window 104 that circumscribes the photoflash 110. The photoflash 110 is circular in FIG. 1, thus the second patterned feature is similarly circular. In other implementations, the photoflash 110 and corresponding groove may have a different shape (e.g., rectangular). The perimeter groove 118 may be filled with an opaque material (e.g., an ink or solid filler such as a gasket). The opaque material within the perimeter groove 118 serves to reduce or prevent light leakage from the photoflash 110 to the side within the shared window 104, which may negatively affect the cameras 106, 108 and/or the sensor 116.

Still another patterned feature is a bottom groove (not shown) in the shared window 104 that occupies non-light emitting portions of the photoflash 110. The photoflash 110 is circular in FIG. 1, thus the third patterned feature is similarly circular. In other implementations, the photoflash 110 and corresponding bottom groove may have a different shape (e.g., rectangular). The bottom groove is filled with an opaque material (e.g., an ink or solid filler such as a gasket). The opaque material within the bottom groove serves to reduce or prevent light leakage from the photoflash 110 to the rear of the digital camera module 102, which may be reflected back upward to the shared window 104, and which may negatively affect the cameras 106, 108 and/or the sensor 116.

In various implementations, the shared window 104 may be substantially transparent or translucent in areas overlying the cameras 106, 108 and the photoflash 110, while the shared window 104 may be substantially opaque in some or all other areas. For example, in areas of the shared window 104 that are etched with a Fresnel pattern, the shared window 104 is translucent. For example, in areas of the shared window 104 that include a simple convex lens, the shared window 104 is transparent.

Figure 2:
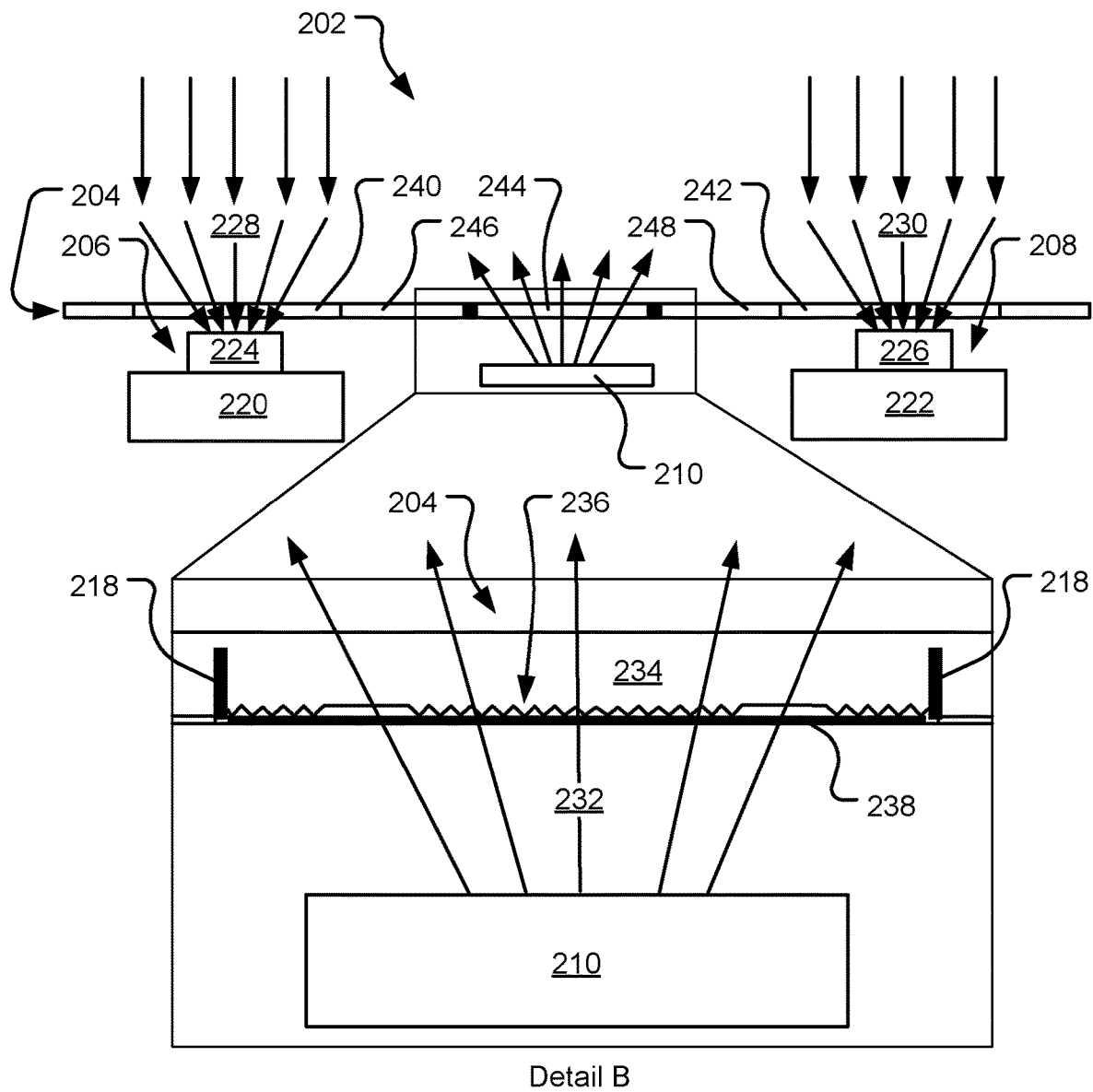
FIG. 2 illustrates a side view of a digital camera module for a computing device having a shared window for two cameras and a photoflash.

FIG. 2 illustrates a side view of a digital camera module 202 for a computing device having a shared window 204 for two cameras 206, 208 and a photoflash 210. The digital camera module 202 is incorporated in a rear-facing exterior surface, a front-facing exterior surface, or another exterior-facing surface of the computing device. In other implementations, multiple digital camera modules, such as the digital camera module 202, are utilized in the computing device. The presently disclosed technology may be applied to a variety of digital camera modules, regardless of their number and location on the computing device. Other implementations of the digital camera module 202 may include one camera or more than two cameras and/or multiple photoflashes, as defined by overall performance specifications of the digital camera module 202.

The cameras 206, 208 each include digital image sensors 220, 222 and camera lenses 224, 226, respectively, to direct incoming light to the digital image sensors 220, 222. Incoming light 228, 230 is directed in a manner that enables the digital image sensors 220, 222 to generate still images or a video output of the incoming light 228, 230 that accurately reflects a scene that that the cameras 206, 208 are visually capturing.

The photoflash 210 (see e.g., Detail B) provides a brief burst of light 232 to help illuminate a scene to be captured by the cameras 206, 208. The photoflash 210 includes one or more high-current flash LEDs that emit the light 232 and a photoflash lens 234 to focus the light 232 output from the high-current flash LEDs. The photoflash 210 is illustrated as between and equidistant from the cameras 206, 208 so that the light output from the photoflash 210 has a similar effect on the cameras 206, 208. Other implementations may place the photoflash 210 elsewhere within the digital camera module 202, particularly if the location of the photoflash 210 with reference to the cameras 206, 208 has little or no effect on camera performance.

The photoflash lens 234 is formed as a patterned area of the shared window 204 overlying the photoflash 210. While the photoflash lens 234 may utilize a variety of patterned features, one example is a Fresnel pattern. Other complex lens patterns contemplated herein for the photoflash lens 234 include convex elements, other Fresnel patterns, and/or other features.

The shared window 204 is a flat layer of transparent or translucent material (e.g., glass or plastic) that extends over the cameras 206, 208 and photoflash 210. The shared window 204 forms a protective barrier to moisture and/or particulate contamination to the cameras 206, 208, and photoflash 210, as well as moisture and/or particulate contamination to an interior of the computing device.

The shared window 204, specifically the photoflash lens 234 area of the shared window 204, includes one or more patterned features 236 (e.g., a Fresnel pattern) on a rear-facing side of the shared window 204. The Fresnel pattern serves to capture oblique light emitted from the photoflash 210 LED(s) and focus the light output to create a photoflash. The Fresnel pattern renders an otherwise transparent shared window 204 to be translucent in the area of the photoflash 210. In other implementations, additional patterned features are located over one or both of the cameras 206, 208 and may include a camera lens(es) incorporated into the shared window 204 in a patterned area overlying one or both of the cameras 206, 208.

Another patterned feature is a perimeter groove 218 in the shared window 204 that circumscribes the photoflash lens 234 area of the shared window 204. Still another patterned feature is a bottom groove 238 in the shared window 204 that occupies non-light emitting portions of the photoflash 210 and/or areas of the shared window 204 between and surrounding the first camera and the photoflash (or all areas of the shared window 204 not occupied by the cameras 206, 208 and the photoflash 210.

The perimeter groove 218 and/or bottom groove 238 may be filled with an opaque material (e.g., an ink or solid filler such as a gasket). The opaque material within the perimeter groove 218 serves to reduce or prevent light leakage from the photoflash 210 to the side within the shared window 204, which may negatively affect the cameras 206, 208. The opaque material within the bottom groove serves to reduce or prevent light leakage from the photoflash 210 to the rear of the digital camera module 202, which may be reflected back upward to the shared window 204, and which may negatively affect the cameras 206, 208.

In various implementations, the shared window 204 may be substantially transparent or translucent in areas 240, 242, 244 overlying the cameras 206, 208 and the photoflash 210, while the shared window 204 may be substantially opaque in some or all other areas (e.g., opaque areas 246, 248). For example, in area 244 of the shared window 204 that is etched with a Fresnel pattern, the shared window 204 is translucent. For further example, the transparent or translucent areas 240, 242, 244 allow the cameras 206, 208 and the photoflash 210 to function most efficiently, while the opaque areas 246, 248 hide internal components of the digital camera module 202 from view. Using a singular structure (e.g., the shared window 204) for these different areas 240, 242, 244, 246, 248 permits the singular structure to serve the purpose of what would otherwise be multiple separate structures, which may yield improved efficiencies in manufacturing (e.g., reduced part count). Further, the singular structure allows a smooth exterior surface, which may be viewed by a user as an indicator of a high-quality overall device.

In other implementations, the shared window 204 with the perimeter groove 218 and/or the bottom groove 238 may be used to isolate optical elements other than the disclosed photoflash 210 and cameras 206, 208. For example, a shared window 204 with perimeter groove 218 may be used to prevent crosstalk between an optical receiver and an optical transmitter in a device utilizing optical time of flight (TOF) as a measurement of distance. This device may use infrared light, for example, projected through the shared window 204, with or without the patterned features 236 (e.g., the Fresnel pattern).

Figure 3:
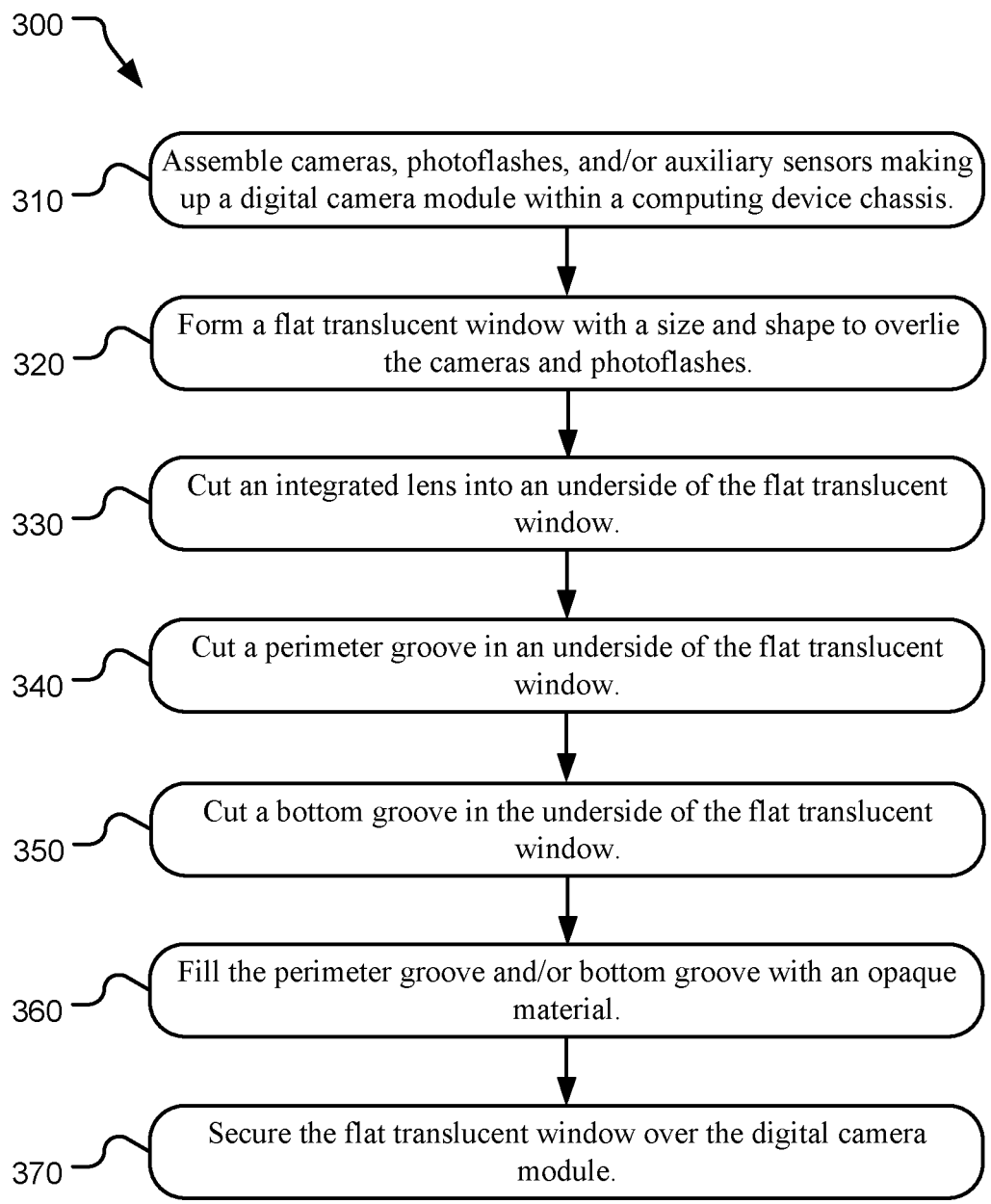
FIG. 3 illustrates example operations for manufacturing a digital camera module having a shared window for two cameras and a photoflash within a mobile computing device.

FIG. 3 illustrates example operations 300 for manufacturing a digital camera module having a shared window for two cameras and a photoflash within a mobile computing device. An assembling operation 310 assembles one or more cameras, photoflashes, and auxiliary sensors making up the digital camera module within a computing device chassis. A forming operation 320 forms a flat translucent window with a size and shape to overlie at least the one or more cameras and photoflashes making up the digital camera module.

A first cutting operation 330 cuts an integrated lens into an underside of the flat translucent window. The integrated lens is positioned on the flat translucent window to overlie the photoflash of the digital camera module when mounted to the mobile computing device. In some implementations, the integrated lens incorporates a Fresnel pattern to focus the light output from one or more LEDs to create the photoflash. Other implementations may incorporate additional integrated lenses for the camera(s) in lieu of or in addition to the integrated lens for the photoflash. Still further implementations may incorporate multiple integrated lenses for multiple photoflashes.

A second cutting operation 340 cuts a perimeter groove in an underside of the flat translucent window. The perimeter groove circumscribes the photoflash when the flat translucent window is secured over the digital camera module and mounted to the mobile computing device. In some implementations, the perimeter groove extends through a majority of an overall thickness of the flat translucent window to maximize an associated reduction in light leakage from the photoflash to the side within the shared window, while maintaining the structural integrity of the flat translucent window.

A third cutting operation 350 cuts a bottom groove in the underside of the flat translucent window. The bottom groove occupies an area of the flat translucent window surrounding the first camera and the photoflash when the flat translucent window is secured over the digital camera module and mounted to the mobile computing device. In some implementations, the bottom groove occupies all areas of the shared window not occupied by the cameras and the photoflash to maximize an associated reduction in light leakage from the photoflash to the rear of the digital camera module, which may be reflected back upward to the shared window.

In an example implementation, the forming operation 320 is performed by molding, extruding, float glass or any other process suitable to generate the flat translucent window. In some implementations, the formed translucent material is diced to a suitable size to serve as the formed flat translucent window. The cutting operations 330, 340, 350 are performed by milling, drilling, etching, engraving, or any other process that are suitable to remove material from the formed flat translucent window to generate the desired integrated lens, perimeter groove, and/or bottom groove in the formed flat translucent window.

In some implementations, the forming operation 320 may be combined with one or more of the cutting operations 330, 340, 350 in a singular step. For example, the flat translucent window may be injection molded with the integrated lens, perimeter groove, and/or bottom groove incorporated into the mold. In such implementations, the forming operation 320 includes the result of one or more of the cutting operations 330, 340, 350.

A filling operation 360 fills the perimeter groove and/or bottom groove with an opaque material. The opaque material is one generally considered to be opaque within the visible light spectrum (e.g., a black or otherwise dark colored material). The filling operation 360 may be performed by injecting or printing, for example, in the case that the opaque material is applied in a liquid or powder form (e.g., an ink or toner) and then cured within the perimeter groove and/or bottom groove. The filling operation 360 may be performed by applying, adhering, or pressing, for example, in the case that the opaque material is applied in a solid form (e.g., a gasket) within the perimeter groove and/or bottom groove.

A securing operation 370 secures the flat translucent window over the digital camera module. The securing operation 370 may be performed using an adhesive or press-fit mechanical connection in combination with application of heat and/or pressure applied to the flat translucent window.

The technical effect of a shared window that incorporates one or more integrated lenses is overall reduced part count and complexity of the associated computing device. Otherwise, the lenses would be separate parts within the computing device. Further, incorporating the lenses into the shared window may permit a smaller thickness dimension of the digital camera module a space that would otherwise be present between the lenses and the window is not present.

In various implementations, the operations 300 may be repeated to manufacture multiple digital camera modules within a singular mobile computing device. Further, the operations 300 may be referred to variously as operations, steps, objects, or modules. Furthermore, the operations 300 may be performed in any order, adding or omitting operations as desired, unless explicitly claimed otherwise or a specific order is inherently necessitated by the claim language.

Example implementations disclosed herein include a computing device camera module comprising a first camera, a photoflash, and a flat translucent window extending over the first camera and the photoflash. An underside of the flat translucent window includes a lens oriented over the photoflash.

In another example implementation, the lens includes a Fresnel pattern.

In another example implementation, a perimeter groove is formed in the underside of the flat translucent window. The perimeter groove circumscribes the photoflash.

In another example implementation, the perimeter groove is filled with an opaque material.

In another example implementation, a bottom groove is formed in the underside of the flat translucent window, the bottom groove occupying an area of the flat translucent window surrounding the first camera and the photoflash.

In another example implementation, the bottom groove is filled with an opaque material.

In another example implementation, the flat translucent window is transparent over the first camera and translucent over the photoflash.

Another example implementation further comprises a second camera. The photoflash is oriented between the first camera and the second camera. The flat translucent window extends over the second camera.

In another example implementation, the flat translucent window is one of glass and plastic.

Further example implementations disclosed herein include a method of manufacturing a computing device camera module comprising assembling a first camera and a photoflash within a computing device chassis, forming a flat translucent window including a lens on an underside of the flat translucent window, and securing the flat translucent window over the first camera and the photoflash. The lens is oriented over the photoflash.

Another example implementation further comprises forming a perimeter groove in the underside of the flat translucent window and filling the perimeter groove with an opaque material. The perimeter groove circumscribes the photoflash when the flat translucent window is secured over the first camera and the photoflash.

Another example implementation further comprises forming a bottom groove in the underside of the flat translucent window and filling the bottom groove with an opaque material. The bottom groove occupies an area of the flat translucent window surrounding the first camera and the photoflash.

Further example implementations disclosed herein include a computing device camera module comprising a first camera, a photoflash, and a flat translucent window extending over the first camera and the photoflash. A perimeter groove is formed in an underside of the flat translucent window. The perimeter groove circumscribes the photoflash and is filled with an opaque material.

In another example implementation, the underside of the flat translucent window includes a lens oriented over the photoflash.

In another example implementation, the lens includes a Fresnel pattern.

In another example implementation, a bottom groove is formed in the underside of the flat translucent window, the bottom groove occupying an area of the flat translucent window surrounding the first camera and the photoflash.

In another example implementation, the bottom groove is filled with the opaque material.

In another example implementation, the flat translucent window is transparent over the first camera and translucent over the photoflash.

Another example implementation further comprises a second camera. The photoflash is oriented between the first camera and the second camera. The flat translucent window extends over the second camera.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A computing device camera module comprising:
   a first camera;
   a photoflash; and
   a flat translucent window extending over the first camera and the photoflash, wherein an underside of the flat translucent window includes a lens oriented over the photoflash, wherein the flat translucent window is transparent over the first camera and translucent over the photoflash.

2. The computing device camera module of claim 1, wherein the lens includes a Fresnel pattern.

3. The computing device camera module of claim 1, wherein a perimeter groove is formed in the underside of the flat translucent window, the perimeter groove circumscribing the photoflash.

4. The computing device camera module of claim 3, wherein the perimeter groove is filled with an opaque material.

5. The computing device camera module of claim 1, wherein a bottom groove is formed in the underside of the flat translucent window, the bottom groove occupying an area of the flat translucent window surrounding the first camera and the photoflash.

6. The computing device camera module of claim 5, wherein the bottom groove is filled with an opaque material.

7. The computing device camera module of claim 1, further comprising:
   a second camera, wherein the photoflash is oriented between the first camera and the second camera, and wherein the flat translucent window extends over the second camera.

8. The computing device camera module of claim 1, wherein the flat translucent window is one of glass and plastic.

9. A method of manufacturing a computing device camera module comprising:
   assembling a first camera and a photoflash within a computing device chassis;
   forming a flat translucent window including a lens on an underside of the flat translucent window; and
   securing the flat translucent window over the first camera and the photoflash, wherein the lens is oriented over the photoflash and the flat translucent window is transparent over the first camera and translucent over the photoflash.

10. The method of manufacturing a computing device camera module of claim 9, further comprising:
    forming a perimeter groove in the underside of the flat translucent window; and
    filling the perimeter groove with an opaque material, wherein the perimeter groove circumscribes the photoflash when the flat translucent window is secured over the first camera and the photoflash.

11. The method of manufacturing a computing device camera module of claim 9, further comprising:
    forming a bottom groove in the underside of the flat translucent window; and
    filling the bottom groove with an opaque material, wherein the bottom groove occupies an area of the flat translucent window surrounding the first camera and the photoflash.

12. A computing device camera module comprising:
    a first camera;
    a photoflash; and
    a flat translucent window extending over the first camera and the photoflash, wherein a perimeter groove is formed in an underside of the flat translucent window, the perimeter groove circumscribing the photoflash and filled with an opaque material, wherein the flat translucent window is transparent over the first camera and translucent over the photoflash.

13. The computing device camera module of claim 12, wherein the underside of the flat translucent window includes a lens oriented over the photoflash.

14. The computing device camera module of claim 13, wherein the lens includes a Fresnel pattern.

15. The computing device camera module of claim 12, wherein a bottom groove is formed in the underside of the flat translucent window, the bottom groove occupying an area of the flat translucent window surrounding the first camera and the photoflash.

16. The computing device camera module of claim 15, wherein the bottom groove is filled with the opaque material.

17. The computing device camera module of claim 12, further comprising:
    a second camera, wherein the photoflash is oriented between the first camera and the second camera, and wherein the flat translucent window extends over the second camera.

18. The computing device camera module of claim 12, wherein the flat translucent window is one of glass and plastic.

* * * * *